United States Patent Office.

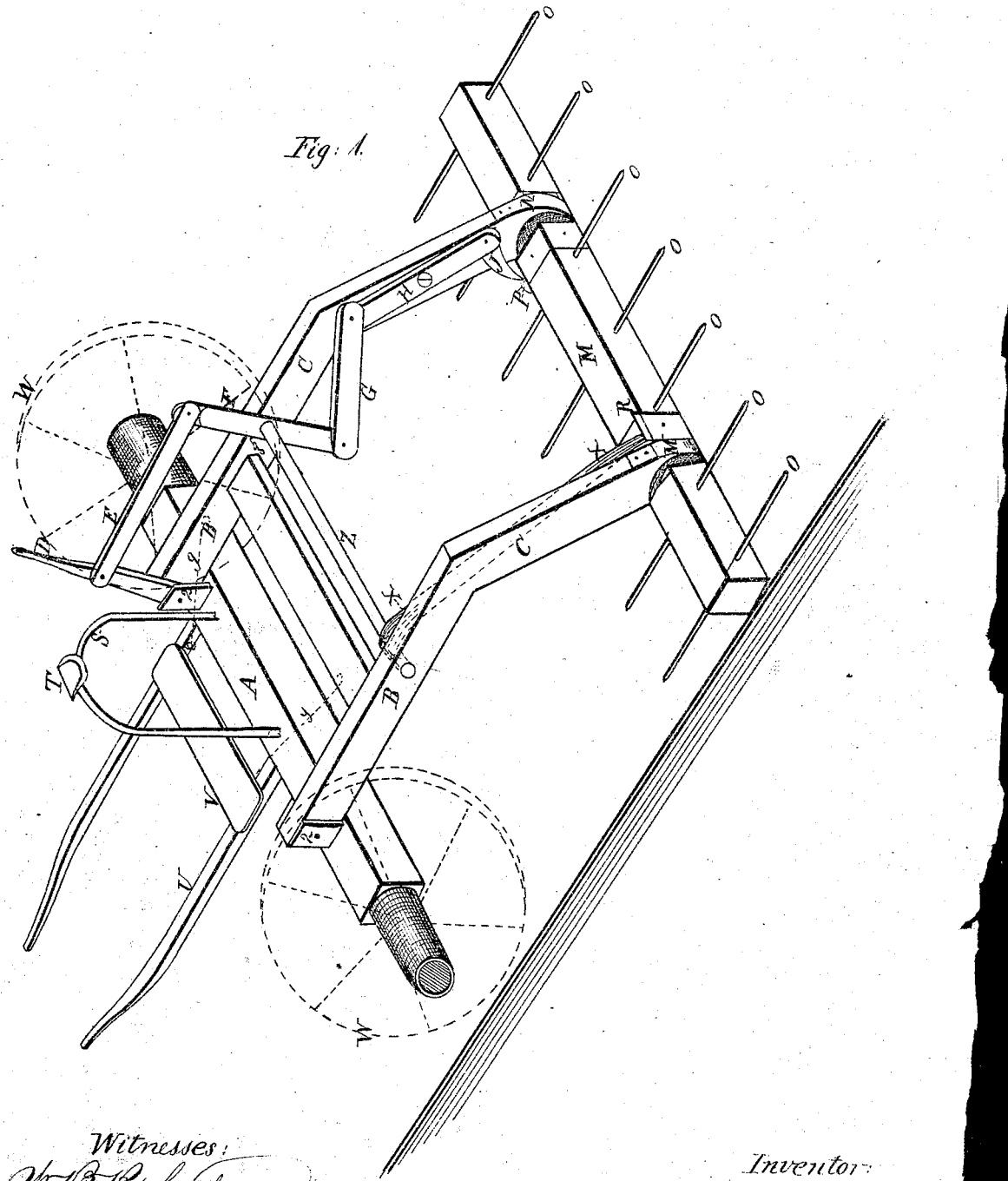

T. J. SHREVES, OF GREENBUSH, ILLINOIS.

*Letters Patent No. 80,772, dated August 4, 1868.*

IMPROVEMENT IN HORSE-RAKES.

*The Schedule referred to in these Letters Patent and making part of the same.*

TO ALL WHOM IT MAY CONCERN:

Be it known that I, T. J. SHREVES, of Greenbush, in the county of Warren, and State of Illinois, have invented a new and improved Sulky-Rake; and I do hereby declare that the following is a full, clear, and exact description of the construction and operation of the same, reference being had to the annexed drawings, making a part of this specification, in which—

Figure 1 is a perspective view of the entire machine.

The nature of my invention relates to constructing a horse hay-rake in such manner and combining in such a method with wheels and axle that a person may ride and easily control the operations of the rake, at the same time doing good and rapid work.

To enable others skilled in the art to make and use my invention, I proceed to the following fuller and clearer description.

The axle A is mounted on the wheels w w, and is drawn by thills or tongue in front. From the axle is elevated the seat T by means of the rods or braces g.

Mortised into the axle are the pieces Q, in which the main frame B C is pivoted, to allow a vertical movement of the rear end.

The main frame B B, C C carries at the rear end the rake-head M, by means of the bands M″ M″, enclosing suitable journals on the rake-head M.

Z represents a cross-piece, of suitable material, operating as a pivot for the lever F.

By means of the handle D, which is pivoted in the pieces Q, and by means of the bar E, lever F, bar G, and lever H, and pawl J, the rake may be revolved.

The pawl X holds the rake firmly from revolving, by catching the catch P, and when the handle D is thrown forward, it will readily be seen that it releases the pawl X, and throws sufficient weight on the pawl J to revolve the rake, which will be caught firmly again as soon as it revolves, and held in proper position for work until, by means of throwing the handle forward, it is again revolved.

The hooks y y are attached forward to the thills. By raising the main frame B C, and hooking these hooks in the staples g g, the whole frame may be supported and held off the ground for convenience in moving from place to place.

The rake-head M is constructed similar to the ordinary revolving rakes.

The catches P and R are, of course, provided on the diagonal corners from that seen in the drawing.

There is a great advantage derived by having the main frame in the rear of the axle, in place of the front, it giving more and easier control of the whole thing.

Having thus described my invention, what I claim as new, and desire to secure by Letters Patent, is—

1. The pawl X, in combination with device d, e, F, G, H, and S, substantially as described, and for the purpose set forth.

2. The hooks y y, substantially as described, and in combination with the main frame, as set forth.

T. J. SHREVES.

Witnesses:
W. B. RICHARDS,
GEO. F. WILSON.